(12) United States Patent
Young

(10) Patent No.: US 7,654,861 B2
(45) Date of Patent: Feb. 2, 2010

(54) CONNECTOR AND METHOD THEREOF

(75) Inventor: Sea-Weng Young, Taipei County (TW)

(73) Assignee: Inventec Appliances Corp., Taipei (TW)

( * ) Notice: Subject to any disclaimer, the term of this patent is extended or adjusted under 35 U.S.C. 154(b) by 201 days.

(21) Appl. No.: 12/007,764

(22) Filed: Jan. 15, 2008

(65) Prior Publication Data

US 2008/0220623 A1    Sep. 11, 2008

(30) Foreign Application Priority Data

Mar. 9, 2007    (TW) ............................. 96108164 A

(51) Int. Cl.
*H01R 11/00* (2006.01)
(52) U.S. Cl. .................................................. 439/502
(58) Field of Classification Search .................. 439/502
See application file for complete search history.

(56) References Cited

U.S. PATENT DOCUMENTS 6,728,108 B2 *  4/2004  Chen ........................... 361/736
6,746,273 B1 *  6/2004  Liu et al. .................... 439/502
7,128,600 B2 * 10/2006  Osypka ....................... 439/502

* cited by examiner

*Primary Examiner*—Truc T Nguyen
(74) *Attorney, Agent, or Firm*—Stites & Harbison PLLC; Juan Carlos A. Marquez, Esq.

(57) ABSTRACT

The invention discloses a connector, which includes a first connecting unit, a second connecting unit, a third connecting unit, and a determining unit. Moreover, the first connecting unit is capable of being electrically connected to a first power source and/or a first data source; and the second connecting unit is capable of being electrically connected to a second power source and/or a second data source. Additionally, the determining unit is electrically connected to the first connecting unit and the second connecting unit respectively, for selectively outputting a data signal and/or a power signal based on a connecting status. Furthermore, the third connecting unit is electrically connected to the determining unit and an electronic device, for transmitting the data signal and/or the power signal from the determining unit to the electronic device.

20 Claims, 5 Drawing Sheets

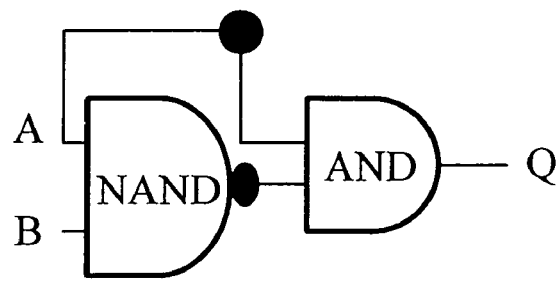
| A | 0 | 0 | 1 | 1 |
|---|---|---|---|---|
| B | 0 | 1 | 0 | 1 |
| Q | 0 | 0 | 1 | 0 |
FIG. 3B
FIG. 3C
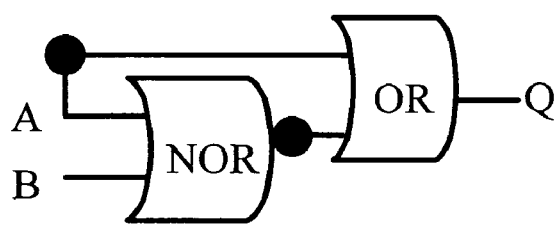
| A | 0 | 0 | 1 | 1 |
|---|---|---|---|---|
| B | 0 | 1 | 0 | 1 |
| Q | 1 | 0 | 1 | 1 |
FIG. 3D
FIG. 3E

| Connecting status | 1 | 2 | 3 | 4 | 5 | 6 | 7 | 8 |
|---|---|---|---|---|---|---|---|---|
| First connecting unit (U1) | Power | None | Data | None | Power | Data | Power | Data |
| Second connecting unit (U2) | None | Power | None | Data | Power | Data | Data | Power |

FIG. 4A

| Condition | 1 | 2 | 3 | 4 | 5 | 6 | 7 | 8 |
|---|---|---|---|---|---|---|---|---|
| Power source | U1 | U2 | U1 | U2 | U1 | U1 | U1 | U2 |
| Data source | None | None | U1 | U2 | None | U1 | U2 | U1 |

FIG. 4B

CONNECTOR AND METHOD THEREOF

BACKGROUND OF THE INVENTION

1. Field of the Invention

The present invention relates generally to a connector and method thereof, more particularly, to a connector and method for supplying both data and power to an electronic device at the same time.

2. Description of the Prior Art

Portable electronic devices, such as mobile phone, personal digital assistant (PDA), and MP3 walkman, have brought modern people a more convenient life. Most of these portable electronic devices can be connected to other electronic apparatus, such as a computer, by a data-transmitting connector to exchange the data. Furthermore, most of these portable electronic devices apply a battery, such as a rechargeable battery, as the power source.

Traditionally, when we want to charge the rechargeable battery of the portable electronic device, we have to use a power connector to electrically connect the portable electronic device with a power source, such as a socket, via a transformer. Furthermore, if we want to exchange the data of the electronic device and recharge the electronic device at the same time, we have to connect the electronic device with both a data-transmitting connector and a power connector. This is highly inconvenient for the users.

Therefore, universal series bus (USB), a new series bus integrated data transmitting function and power supplying function, is established by a number of computer system providers. There are two versions for USB: USB 1.1 has its transmitting speed at 12 Mbps, whereas USB 2.0 has its transmitting speed at 480 Mbps. Because the transmitting speed of USB is significantly higher than the parallel port or serial port of a computer, USB can significantly increase the transmitting efficiency between computer and peripherals.

Because of the advantages that come with USB, such as plug-and-play, hot-plugging, bi-direction transmission, and hi-speed transmission, lots of electronic devices include USB as the necessary connecting interface. USB can transmit data signal and power signal via a cable which contains four main wires, two of which are power wires ($V_{BUS}$/GND), and the other two are data signal wires (D+/D−). Furthermore, the power wire $V_{BUS}$ can provide 5V direct current, so as to charge the electronic device and exchange data with the electronic device at the same time.

Many applications about charging electronic devices and data-exchanging devices by USB connector have been disclosed. For example, Taiwan Patent Publication No. 479393, entitled "USB auto-charging device and method thereof" disclosed a charging device for charging a battery via USB connector; Taiwan Patent Publication No. M247951, entitled "USB data cable with a programmable power charger for mobile phone", disclosed a USB data cable with a programmable power charger for data exchanging between a computer and a mobile phone according to different requirements of charging and data exchanging of mobile phones of different brands, and determining whether to charge the mobile phone or not by using a computer program to control the power source; Taiwan Patent Publication No. M288990, entitled "Function-switching connector", disclosed a connector that can be switch between data transmission and charging.

However, when a user uses the above-mentioned USB device to exchange data between the portable electronic device and recharge the portable electronic device at the same time, problems that have to do with the USB port of the data host, such as a computer with current limitation, often occurred. Sometimes the portable electronic device can not be charged too quickly, otherwise, the battery of the portable electronic device may be damaged by the change of current. Moreover, if the data host, such as a notebook, does not have enough power, charging the portable electronic device will also exhaust the power of the data host.

SUMMARY OF THE INVENTION

Accordingly, the aspect of the present invention is to provide a connector and method thereof, and more particularly, the connector of the invention can provide data and power transmission to an electronic device at the same time without consuming the power from the data host. Moreover, the connector of the invention has a protective mechanism installed to prevent danger when recharging the electronic device.

In a preferred embodiment of the invention, a connector is disclosed. The connector includes a first connecting unit, a second connecting unit, a third connecting unit, and a determining unit.

The first connecting unit can electrically connect to a first power source and/or a first data source; and the second connecting unit can electrically connect to a second power source and/or a second data source.

Additionally, the determining unit is electrically connected to the first connecting unit and the second connecting unit, for selectively outputting a data signal and/or a power signal in accordance with a connecting status of the first connecting unit and the second connecting unit. The third connecting unit is electrically connected to the determining unit and an electronic device, for transmitting the data signal and/or the power signal to the electronic device.

In another preferred embodiment of the invention, a method for using a connector to selectively electrically connect a first power source, a first data source, a second power source, and a second data source to an electronic device is disclosed. The method is as follows: selectively output a data signal and/or a power signal to the electronic device in accordance with a connecting status of the first power source, the first data source, the second power source, and the second data source.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 3B shows part of the logical circuits of FIG. 3A.

FIG. 3C is the truth table of the logical circuits of FIG. 3B.

FIG. 3D shows part of the logical circuits of FIG. 3A.

FIG. 3E is the truth table of the logical circuits of FIG. 3D.

FIG. 4A illustrates the connect status of the first connecting unit U1 and the second connecting unit U2 of FIG. 3A.

FIG. 4B shows the power source and the data source of each connect status in FIG. 4A.

DETAILED DESCRIPTION OF THE INVENTION

Figure 1:
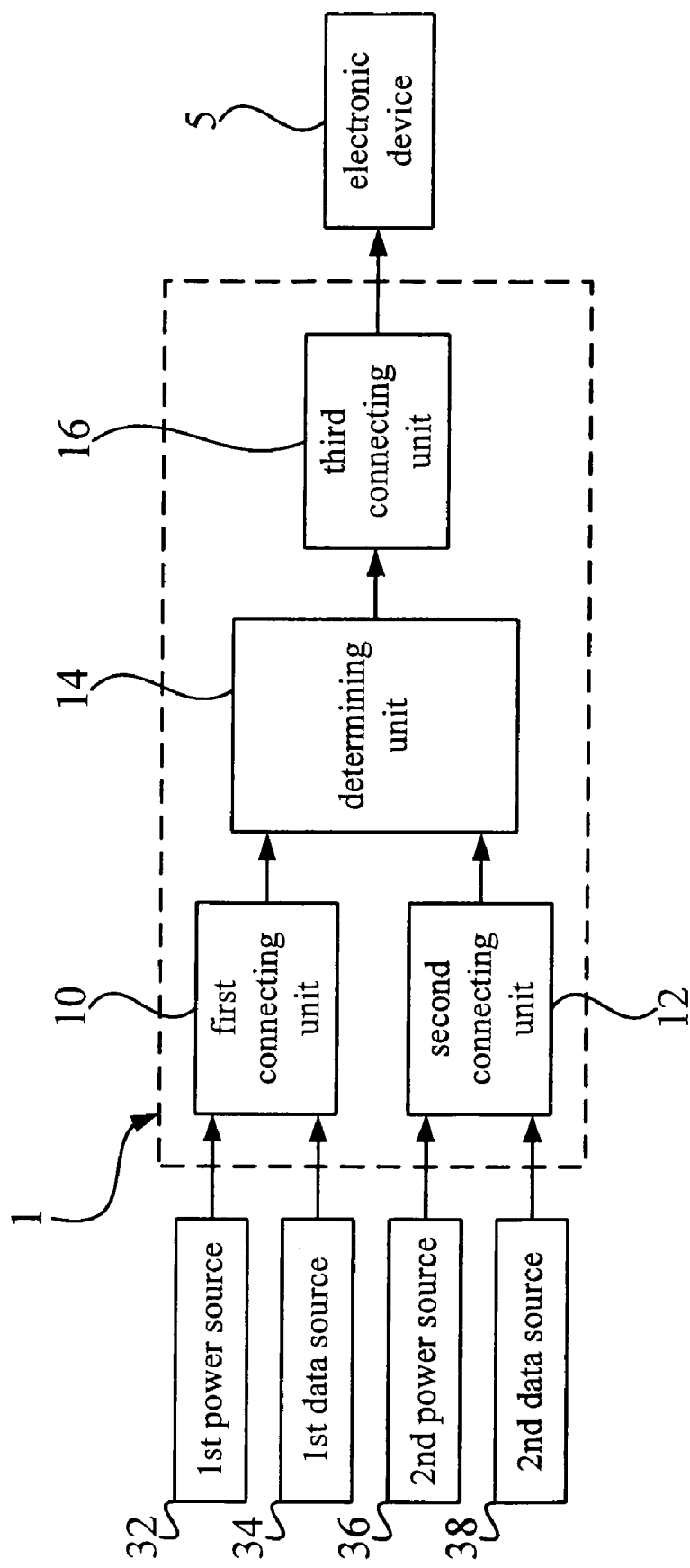
FIG. 1 is a function block of a connector of a preferred embodiment of the invention.

Please refer to FIG. 1, which shows a function block of a connector of a preferred embodiment of the invention. As shown in FIG. 1, the connector I includes a first connecting unit 10, a second connecting unit 12, a determining unit 14, and a third connecting unit 16. In practice, the connecting unit 10, 12, and 16 are complied with the specification of universal series bus (USB). Therefore, the connector 1 of the invention can be an USB connector.

Additionally, the first connecting unit 12 can be electrically connected to a first power source 32 and/or a first data source 34; whereas the second connecting unit 14 can be electrically connected to a second power source 36 and/or a second data source 38. In practice, the power source can be a direct current power source or an alternating current power source. Moreover, in practice, the data source can be, but not limited to, a computer and a PDA. Please note that the power source and the data source can be the same electronic apparatus, such as a computer or other suitable apparatus.

Furthermore, the determining unit 14 is electrically connected to the first connecting unit 10 and the second connecting unit 12, for selectively outputting a data signal and/or a power signal in accordance with a connecting status. Moreover, the third connecting unit 16 is electrically connected to the determining unit 14 and an electronic device 5, for transmitting the data signal and/or the power signal to the electronic device 5. In practice, the electronic device 5 can be, but not limited to, a mobile phone or a PDA.

In an embodiment, when the connecting status shows the first connecting unit electrically connected to the first data source and the second connecting unit electrically connected to the second data source, the determining unit outputs the data signal of the first data source.

In another embodiment, when the connecting status shows the first connect unit electrically connected to the first power source and the second connecting unit electrically connected to the second power source, the determining unit outputs the power signal of the first power source.

In yet another embodiment, when the connecting status shows the first connect unit electrically connected to the first power source and the second connecting unit electrically connected to the second power source, the determining unit determines the current intensity of the first power source and the second power source, and outputs the power signal of the power source with larger current intensity.

Figure 2:
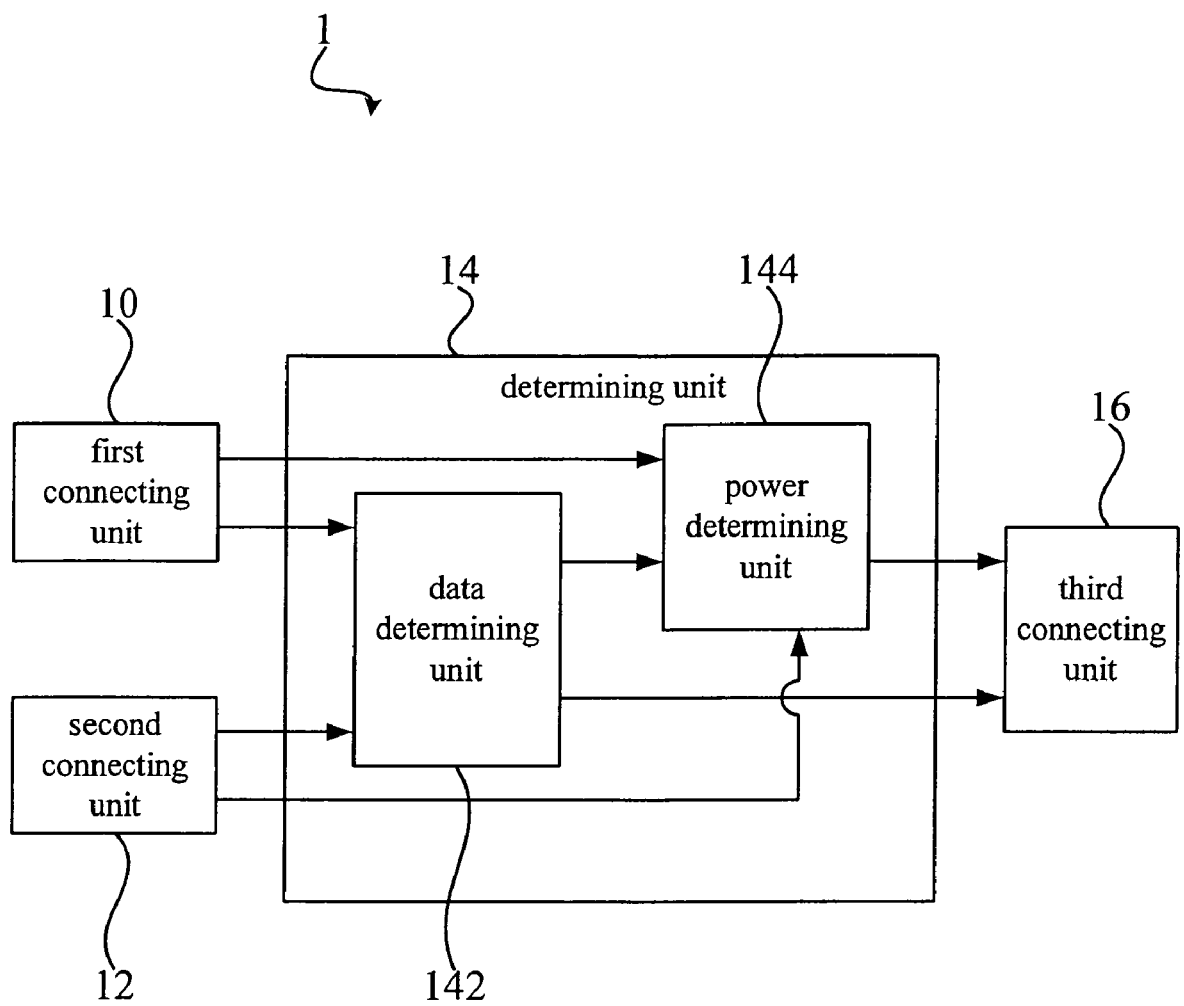
FIG. 2 is a function block of a connector of an embodiment of the invention.

Please refer to FIG. 2, which shows a function block of a connector of an embodiment of the invention. In the embodiment, the above-mentioned connecting status can further include a data connecting status and a power connecting status. Additionally, the determining unit 14 of the connector 1 further includes a data determining unit 142 and a power determining unit 144. The data determining unit 142 can be used to selectively output the data signal in accordance with the data connecting status; whereas the power determining unit 144 can be used to selectively output the power signal in accordance with the power connecting status.

In an embodiment, the determining unit of the connector of the invention can include at least a logic gate and/or at least a switch. In practice, the logical gate can include AND gate, NOR gate, NAND gate, and OR gate, and other suitable logical gates.

In an embodiment, the determining unit of the connector of the invention can include at least a Metal Oxide Semiconductor Field Effect Transistor (MOSFET), such as a p-channel MOSFET. Additionally, in an embodiment, the determining unit of the connector of the invention can include a Low Dropout Regulator (LDO).

Figure 3A:
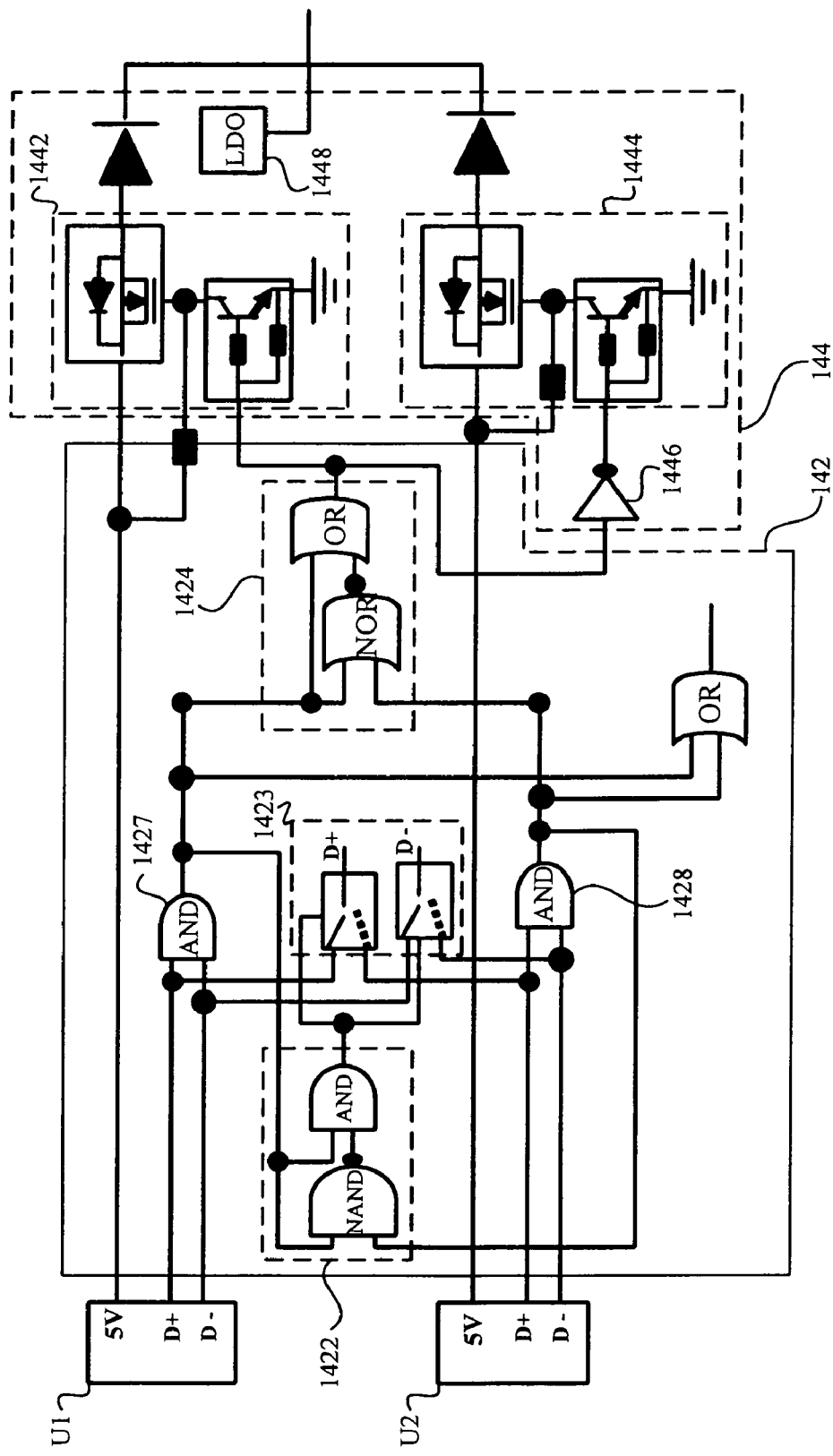
FIG. 3A shows the circuit diagram of a determining unit of an embodiment of the invention.

Please refer to FIG. 3A to 3E and FIGS. 4A and 4B. FIG. 3A shows the circuit diagram of the determining unit 14 of an embodiment of the invention; FIG. 3B shows part of the logical circuits of FIG. 3A; FIG. 3C is the truth table of the logical circuits of FIG. 3B; FIG. 3D shows another part of the logical circuits of FIG. 3A; FIG. 3E is the truth table of the logical circuits of FIG. 3D; FIG. 4A shows the connecting status of the first connecting unit U1 and the second connecting unit U2 of FIG. 3A; and FIG. 4B shows the power source and the data source of each of the connecting status of FIG. 4A. Please note that in the embodiment, both of the default data signal and power signal are outputted from the first connecting unit U1.

As shown in FIG. 3A, the determining unit 14 includes a data determining unit 142 and a power determining unit 144. Moreover, the data determining unit 142 further includes a first AND gate 1427 electrically connected to the D+ and D− data signal line of a first connecting unit U1; a second AND gate 1428 electrically connected to the D+ and D− data signal line of a second connecting unit U2; a NAND+AND gate 1422, electrically connected to the first AND gate 1427 and the second AND gate 1428, for receiving the output signals of these two AND gate 1427 and 1428 as an input signal thereof; and a set of switch 1423, electrically connected to the D+ data signal lines, the D− data signal lines, and the NAND+AND gate 1422, respectively, for receiving the output signal of the NAND+AND gate 1422 to selectively output the data signal from the first connecting unit U1 or the second connecting unit U2.

Furthermore, the data determining unit 142 includes a NOR+OR gate 1424, electrically connected to the first AND gate 1427 and the second AND gate 1428 respectively, for receiving the output signals of these two AND gate 1427 and 1428 as an input signal thereof, and outputs a control signal to the power determining unit 144 to control the power determining unit 144, and selectively outputs power signal according to the power connecting status.

As show in FIG. 3A, the power determining unit 144 includes an inverter 1446, electrically connected to the NOR+OR gate 1424, for inverting the control signal; a first transistor 1442, electrically connected to the power line of the first connecting unit U1 and the NOR+OR gate 1424, for outputting the power signal from the first connecting unit U1 in accordance with the control signal and the power connecting status of the first connecting unit U1; a second transistor 1444, electrically connected to the power line of the second connecting unit U2 and the inverter 1446, for outputting the power signal from the second connecting unit U2 in accordance with the inverted control signal and the power connecting status of the second connecting unit U2; and a LDO 1448 for stabilizing the voltage of the outputted power signal.

For example, when the first connecting unit U1 of FIG. 3A is electrically connected to a power source, and the second connecting unit U2 is electrically connected to a data source (as the connecting status 7 of FIG. 4A), because the first connecting unit U1 does not connect to data source, and the data signal lines D+ and D− have no signal, and the output of the first AND gate 1427 is "0". On the other hand, the output of the second AND gate 1428 is "1". Referring to FIG. 3B and FIG. 3C, the output signal of the NAND+AND gate 1422 is "0", at this time, the set of switch 1423 and the data signal line of the second connecting unit U2 are connected, so as to output the data signal from the second connecting unit U2 (as the condition 7 of FIG. 4B). Furthermore, referring to FIG.

3D and FIG. 3E, the NOR+OR gate 1424 receives the output "0" of the first AND gate 1427 and the output "1" of the second AND gate 1428, and then output a control signal "0". Afterward, the first transistor 1442 receives the control signal "0", whereas the second transistor 1444 receives the control signal "1" from the inverter 1446. Because there is no power signal from the power line of the second connecting unit U2 which is connected by the second transistor 1444, the first transistor 1442 outputs the power signal from the first connecting unit U1 (as the condition 7 of FIG. 4B).

For another example, when both the first connecting unit U1 and the second connecting unit U2 are electrically connected to data sources (such as the USB ports of a computer—as the connecting status 6 of FIG. 4A), because the D+ data signal lines and D− data signal lines of the connecting unit U1 and U2 have signal, both the output of the first AND gate 1427 and the second AND gate 1428 are "1", and the output of the NAND+AND gate 1422 is "0". At this time, the set of switch 1423 outputs the data signal from the first connecting unit U1 according to the default status (as the condition 6 of FIG. 4B). Furthermore, the NOR+OR gate 1424 receives the outputs of the first AND gate 1427 and the second AND gate 1428, and then outputs a control signal "1". Afterward, the first transistor 1442 receives the control signal "1", whereas the second transistor 1444 receives the control signal "0" from the inverter 1446. Therefore, the first transistor 1442 outputs the power signal from the first connecting unit U1 and the second transistor 1444 outputs no signal (as the condition 6 of FIG. 4B).

For another example, when both of the first connecting unit U1 and the second connecting unit U2 of FIG. 3A are electrically connected to power source (as the connecting status 5 of FIG. 4A), because the connecting unit U1 and U2 are not connected to data source, there is no signal of the D+ data signal lines and the D− data signal lines, and the output of the first AND gate 1427 and the second AND gate 1428 are "0", the set of switch outputs no data signal (as the condition 5 of FIG. 4B). Furthermore, the NOR+OR gate 1424 receives the outputs of the first AND gate 1427 and the second AND gate 1428, and outputs a control signal "1". Afterward, the first transistor 1442 receives the control signal "1", whereas the second transistor 1444 receives the control signal "0" from the inverter 1446. Therefore, the first transistor 1442 outputs the power signal from the first connecting unit U1 and the second transistor 1444 outputs no signal (as the condition 5 of FIG. 4B).

For another example, when the first connecting unit U1 of FIG. 3A is electrically connected to the power source, and the second connecting unit U2 has no connection (as the connecting status 1 of FIG. 4A), because both the connecting units U1 and U2 are not connected to data source, the D+ data signal lines and D− data signal lines have no signal, and both outputs of the first AND gate 1427 and the second AND gate 1428 are "0", and the set of switch 1423 outputs no data signal (as the condition 1 of FIG. 4B). Furthermore, the NOR+OR gate 1424 receives the outputs of the first AND gate 1427 and the second AND gate 1428, and then outputs a control signal "1". Afterward, the first transistor 1442 receives the control signal "1", whereas the second transistor 1444 receives the control signal "0" from the inverter 1446. Therefore, the first transistor 1442 outputs the power signal from the first connecting unit U1 (as the condition 1 of FIG. 4B).

Please note that other connecting status of FIG. 4A and related conditions of FIG. 4B can be estimated through the above-mentioned ways, and discussion of unnecessary details will be hereby omitted. Furthermore, it should be noticed that the above-mentioned circuit of connector is used as an embodiment to illustrate the invention, but not a limitation of the layout of the connector of the invention. In other words, the circuit of the connector of the invention can be optionally modified to obtain the same function.

In a preferred embodiment, the invention provides a method for using a connector to selectively and electrically connect a first power source, a first data source, a second power source, and a second data source to an electronic device. The method includes the following step: selectively outputs a data signal and/or a power signal to the electronic device in accordance with a connecting status of the first power source, the first data source, the second power source, and the second data source.

In an embodiment, when the connecting status is electrically connected to the first data source and the second data source at the same time, the method further includes the following step: outputs the data signal of the first data source.

In an embodiment, when the connecting status is electrically connected to the first power source and the second power source at the same time, the method further includes the following step: outputs the power signal of the first power source.

In an embodiment, when the connecting status is electrically connected to the first power source and the second power source at the same time, the method further includes the following step: determines the current intensity of the first power source and the second power source, and outputs the power signal of the power source with larger current intensity.

In an embodiment, the connecting status includes a data connecting status and a power connecting status, and the method further includes the steps of: selectively outputting the data signal according to the data connecting status; and selectively outputting the power signal according to the power connecting status.

In practice, the embodiment can further include the following steps: generates a control signal according to the data connecting status; and selectively outputs the power signal according to the control signal and the power connecting status.

In practice, when the data connecting status is electrically connected to the first data source and the second data source at the same time, the method further includes the following step: outputs the data signal of the first data source.

In practice, when the power connecting status is electrically connected to the first power source and the second power source at the same time, the method further includes the following step: outputs the power signal of the first power source.

In practice, when the power connecting status is electrically connected to the first power source and the second power source at the same time, the method further includes the steps of: determining the current intensity of the first power source and the second power source, and outputting the power signal of the power source with larger current intensity.

Although the present invention has been illustrated and described with reference to the preferred embodiment thereof, it should be understood that it is in no way limited to the details of such embodiment but is capable of numerous modifications within the scope of the appended claims.

What is claimed is:

1. A connector comprising:
   a first connecting unit, electrically connected to a first power source and/or a first data source;
   a second connecting unit, electrically connected to a second power source and/or a second data source;
   a determining unit, electrically connected to the first connecting unit and the second connecting unit, for selectively outputting a data signal and/or a power signal in accordance with a connecting status of the first connecting unit and the second connecting unit; and a third connecting unit, electrically connected to the determining unit and an electronic device, for transmitting the data signal and/or the power signal to the electronic device.

2. The connector of claim 1, wherein when the connecting status is that the first connecting unit being electrically connected to the first data source and the second connecting unit being electrically connected to the second data source, the determining unit outputting the data signal of the first data source.

3. The connector of claim 1, wherein when the connecting status is that the first connecting unit being electrically connected to the first power source and the second connecting unit being electrically connected to the second power source, the determining unit outputs the power signal of the first power source.

4. The connector of claim 1, wherein when the connecting status is that the first connecting unit being electrically connected to the first power source and the second connecting unit being electrically connected to the second power source, the determining unit determining the current intensity of the first power source and the second power source, and outputting the power signal of the power source with larger current intensity.

5. The connector of claim 1, wherein the connecting status comprises a data connecting status and a power connecting status, and the determining unit further comprising:

a data determining unit, for selectively outputting the data signal in accordance with the data connecting status; and a power determining unit, for selectively outputting the power signal in accordance with the power connecting status.

6. The connector of claim 5, wherein the data determining unit further transmits a control signal to the power determining unit in accordance with the data signal, for controlling the power determining unit selectively outputting the power signal in accordance with the power connecting status.

7. The connector of claim 6, wherein when the data connecting status is that the first connecting unit being electrically connected to the first data source and the second connecting unit being electrically connected to the second data source, the data determining unit outputting the data signal of the first data source.

8. The connector of claim 6, wherein when the power connecting status is that the first connecting unit being electrically connected to the first power source and the second connecting unit being electrically connected to the second power source, the power determining unit outputting the power signal of the first power source.

9. The connector of claim 6, wherein when the power connecting status is that the first connecting unit being electrically connected to the first power source and the second connecting unit being electrically connected to the second power source, the power determining unit determining the current intensity of the first power source and the second power source, and outputting the power signal of the power source with larger current intensity.

10. The connector of claim 1, wherein the first connecting unit and/or the second connecting unit and/or the third connecting unit be complied with the specification of universal series bus (USB).

11. The connector of claim 1, wherein the electronic device is a mobile phone or a personal digital assistant (PDA).

12. A method for using a connector to selectively and electrically connect a first power source, a first data source, a second power source, and a second data source to an electronic device, the method comprising the step of:

selectively outputting a data signal and/or a power signal to the electronic device in accordance with a connecting status of the first power source, the first data source, the second power source, and the second data source.

13. The method of claim 12, wherein when the connecting status is electrically connected to the first data source and the second data source at the same time, the method further comprising the step of:

outputting the data signal of the first data source.

14. The method of claim 12, wherein when the connecting status is electrically connected to the first power source and the second power source at the same time, the method further comprises the step of:

outputting the power signal of the first power source.

15. The method of claim 12, wherein when the connecting status is electrically connected to the first power source and the second power source at the same time, the method further comprises the step of:

determining the current intensity of the first power source and the second power source, and outputting the power signal of the power source with larger current intensity.

16. The method of claim 12, wherein the connecting status comprises a data connecting status and a power connecting status, and the method further comprising the steps of:

selectively outputting the data signal according to the data connecting status; and selectively outputting the power signal according to the power connecting status.

17. The method of claim 16, further comprising the steps of:

generating a control signal; and selectively outputting the power signal according to the control signal and the power connecting status.

18. The method of claim 17, wherein when the data connecting status is electrically connected to the first data source and the second data source at the same time, the method further comprising the step of:

outputting the data signal of the first data source.

19. The method of claim 17, wherein when the power connecting status is electrically connected to the first power source and the second power source at the same time, the method further comprises the step of:

outputting the power signal of the first power source.

20. The method of claim 17, wherein when the power connecting status is electrically connected to the first power source and the second power source at the same time, the method further comprises the step of:

determining the current intensity of the first power source and the second power source, and outputting the power signal of the power source with larger current intensity.

* * * * *